United States Patent
Morioka et al.

(10) Patent No.: US 9,290,921 B2
(45) Date of Patent: Mar. 22, 2016

(54) REMOTE CONTROL APPARATUS

(71) Applicant: TOTO LTD., Fukuoka (JP)

(72) Inventors: Satoko Morioka, Kitakyushu (JP);
Toshio Koguro, Kitakyushu (JP);
Masahiro Kuroishi, Kitakyushu (JP);
Masateru Miyazaki, Kitakyushu (JP);
Yuta Sakai, Kitakyushu (JP); Masami Yamanaka, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 112 days.

(21) Appl. No.: 14/228,076

(22) Filed: Mar. 27, 2014

(65) Prior Publication Data
US 2014/0289951 A1    Oct. 2, 2014

(30) Foreign Application Priority Data

Mar. 27, 2013   (JP) ................................. 2013-066819

(51) Int. Cl.
*E03D 9/08*    (2006.01)
*H04Q 9/00*    (2006.01)

(52) U.S. Cl.
CPC ... *E03D 9/08* (2013.01); *H04Q 9/00* (2013.01)

(58) Field of Classification Search
CPC .... E03D 9/08; G08C 17/00; G08C 2201/112; H02K 1/27; H02K 35/02; H02K 2/18
USPC .................... 290/1 C, 1 R, 38 A, 43, 4 C, 54; 310/156.01, 18, 20–24, 30, 316.03, 310/339; 318/2, 135; 4/406, 420.1–420.5, 4/443–448
See application file for complete search history.

(56) References Cited

U.S. PATENT DOCUMENTS

| | | | | |
|---|---|---|---|---|
| 5,838,138 | A * | 11/1998 | Henty | G06F 1/1616 320/107 |
| 6,897,573 | B1 * | 5/2005 | Shah | H02K 35/02 290/1 A |
| 8,321,968 | B2 * | 12/2012 | Park | E03D 9/08 4/443 |
| 9,041,231 | B2 * | 5/2015 | Kaneko | H02K 7/1853 200/501 |
| 2012/0248937 | A1 * | 10/2012 | Hayamizu | H01L 41/1138 310/339 |

FOREIGN PATENT DOCUMENTS

JP        2006009280 A *  1/2006  ............... E03D 9/08

* cited by examiner

*Primary Examiner* — Paul R Durand
*Assistant Examiner* — Nicholas Ros
(74) *Attorney, Agent, or Firm* — Studebaker & Brackett PC

(57) ABSTRACT

An object of the present invention is to provide a remote control apparatus for a toilet seat apparatus which generates electric power by a user's pressing operation, the remote control apparatus being capable of balancing design quality and transmission accuracy of a signal at a high level.
A remote control apparatus RC has a main button group MB, including a water spray button WB and a water stop button MB1, and a sub-button group SB, including a stronger button SB1, etc. Each button in the sub-button group SB has a circular shape with a diameter smaller than that of each button in the main button group MB from a front view. When a button in the main button group MB is pressed, mechanical energy is transferred to a power generation unit GU by a first slide member 10 and a second slide member 20. On the other hand, when a button in the sub-button group SB is pressed, mechanical energy is transferred only by the second slide member 20 and a loss in the mechanical energy in such situation is smaller than the situation where a button in the main button group MB is pressed.

7 Claims, 9 Drawing Sheets

REMOTE CONTROL APPARATUS

BACKGROUND

1. Field of the Invention

The invention generally relates to a remote control apparatus for remotely controlling a toilet seat apparatus that sprays water toward the private parts of a human body.

2. Description of Related Art

There is a widely-used toilet seat apparatus in existence which sprays water toward private parts of a user seated on a toilet seat in order to cleanse such private parts. The user presses buttons or the like provided on the toilet seat apparatus to select the operations of the toilet seat apparatus, such as starting water spray from a nozzle after relieving himself/ herself, stopping the water spray after cleansing and so on. Another practical and common configuration is such that a remote controller provided with such buttons is installed on a wall surface of a bathroom compartment in order to arrange these buttons in a place where the user can easily operate them, so that the toilet seat apparatus is remotely and wirelessly controlled.

When an operation of the toilet seat apparatus is selected using a remote controller, the electric power required for generating a signal according to the selected content and transmitting the signal to the toilet seat apparatus is typically supplied from a battery in the remote controller or by a commercial power source supplied via wires. However, when the electric power is supplied by a battery or via wires, burdensome work is required in order to replace the batteries and install wires.

Patent Document 1 (JP2006-009280 A) proposes a remote controller for a toilet seat apparatus which eliminates the need for such battery replacement and wire installation. In the remote controller described in Patent Document 1, when a user presses a button on the remote controller, the pressing operation generates electric power and the resulting electric power is used to generate and transmit a signal. More specifically, mechanisms such as a switch and an engagement piece provided in the remote controller are actuated by the user's pressing operation, an impact is made on a piezoceramic body and the resulting electric power is used for generation of a signal, etc.

A remote controller for a toilet seat apparatus is generally provided with buttons (hereinafter referred to as the "main buttons") for causing the toilet seat apparatus to perform operations such as water spray from a nozzle and stop of such water spray, and also provided with buttons (hereinafter referred to as the "sub-buttons") for causing the toilet seat apparatus to perform auxiliary operations such as adjusting the water strength of the water spray from the nozzle. The main buttons are buttons related to the basic operations of the toilet seat apparatus and are pressed by users with a high frequency, and it is therefore desirable to form the main buttons in a large size so that the users can press the buttons easily with their fingers.

In addition, in order to enhance design quality by reducing the size of the entire remote controller, it is common to form the main buttons in a relatively large size and form the sub-buttons, which are pressed less frequently, in a relatively small size.

However, in a situation where such configuration is employed, if electric power is to be generated by means of the pressing operation of a sub-button and a signal is to be generated and transmitted using the electric power, it may not be possible to secure sufficient transmission accuracy. Specifically, if the sub-buttons are formed in a relatively small size, it becomes difficult for a user to press them and it becomes impossible to generate a sufficient amount of electric power, which may result in degradation in the transmission accuracy of a signal. It has therefore been difficult to balance the design quality and the signal transmission accuracy of a remote controller.

The present invention has been made in view of the problems above and an object of the present invention is to provide a remote control apparatus for a toilet seat apparatus which generates electric power by means of a user's pressing operation, the remote control apparatus being capable of balancing design quality and the transmission accuracy of signals at a high level.

SUMMARY

In order to solve the problems above, a remote control apparatus according to an aspect of the present invention is a remote control apparatus for remotely controlling a toilet seat apparatus having a nozzle for spraying water toward private parts of a human body, the remote control apparatus comprising: a selection part which includes: a main button group comprising a plurality of buttons which at least includes a water spray button for causing water spray from the nozzle and a water stop button for stopping water spray from the nozzle; and a sub-button group comprising a plurality of buttons for changing a state of the water spray from the nozzle, the buttons in the sub-button group being formed in a size smaller than the buttons in the main button group from a front view, the selection part selecting an operation of the toilet seat apparatus based on a pressing operation of a user of the toilet seat apparatus; a transfer part which transfers mechanical energy input by the pressing operation in the selection part; a power generation part which generates electric power using the mechanical energy transferred from the transfer part; and a control part which generates a water spray signal when the water spray button is pressed and transmits the water spray signal to the toilet seat apparatus, generates a water stop signal when the water stop button is pressed and transmits the water stop signal to the toilet seat apparatus and generates a change signal when each button in the sub-button group is pressed and transmits the change signal to the toilet seat apparatus, using the electric power generated by the power generation part, wherein a loss in the mechanical energy caused until the mechanical energy input by the pressing operation of each button in the sub-button group is transferred to the power generation part is smaller than a loss in the mechanical energy caused until the mechanical energy input by the pressing operation of each button in the main button group is transferred to the power generation part.

In the remote control apparatus according to the present invention, a loss in mechanical energy caused until the mechanical energy which is input by the pressing operation of each button in the sub-button group, which is formed smaller than each button in the main button group, is transferred to the power generation part is smaller than a loss in the mechanical energy caused by the pressing operation of each button in the main button group. With such configuration, the electric power generated as a result of the pressing operation of each button in the sub-button group can be made large and the change signal can be transmitted with a high transmission accuracy. In other words, it becomes possible to maintain a high quality design by forming each button in the sub-button group in a small size while enhancing the transmission accuracy of the change signal.

In the remote control apparatus according to the present invention, it is preferable that the transfer part includes: an input part which receives force from the selection part as a result of the pressing operation in the selection part; and an output part which transfers mechanical energy by applying force to the power generation part; the pressing operation of a button in the sub-button group causes the input part to receive force in a first direction and causes the output part to apply force to the power generation part in a second direction; and a first linear line passing the input part and extending in the first direction and a second linear line passing the output part and extending in the second direction are configured so as to substantially coincide with each other.

In the preferred embodiment, by configuring the first linear line which passes the input part and extends in the first direction and the second linear line which passes the output part and extends in the second direction so as to substantially coincide with each other, the force received by the input part as a result of the pressing operation of each button in the sub-button group is linearly transferred to the output part. Consequently, since a loss in the mechanical energy caused until the mechanical energy which is input by the pressing operation of each button in the sub-button group is transferred to the power generation part can be made small, relatively large electric power can be generated and the transmission accuracy of the change signal can be enhanced.

In the remote control apparatus according to the present invention, it is preferable that the remote control apparatus further comprises a power storage part which stores electric power generated by the power generation part, in which: the control part generates the water spray signal and the water stop signal and transmits the signals to the toilet seat apparatus using the electric power stored in the power storage part; the power generation part generates, when the water spray button is pressed, electric power larger than electric power required for the control part to generate and transmit the water spray signal so that electric power remains in the power storage part after the control part transmits the water spray signal; and the control part generates and transmit, when the water stop button is pressed, the water stop signal using the electric power generated by the power generation part as a result of the pressing operation of the water stop button and the electric power stored in the power storage part as of the start of the pressing operation.

A user of the toilet seat apparatus after relieving himself/herself first causes the toilet seat apparatus to spray water from the nozzle to cleanse his/her private parts. In the preferred embodiment, the pressing operation of the water spray button by the user causes electric power to remain in the power storage part and the electric power is then used for subsequent generation and transmission of the water stop signal. As a result, even if the electric power generated by the pressing operation of the water stop button is small, the water stop signal can still be transmitted with a high transmission accuracy.

In the remote control apparatus according to the present invention, it is preferable that the control part does not transmit the water spray signal until an amount of electric power generated by the power generation part as a result of the pressing operation of the water spray button becomes equal to or higher than a predetermined amount which allows electric power to remain in the power storage part after the control part transmits the water spray signal.

In the preferred embodiment, after the water spray button is pressed and the water spray signal is transmitted, the electric power can reliably remain in the power storage part. Accordingly, even if the water stop button is subsequently pressed and the resulting electric power is small, the water stop signal can still be transmitted using the electric power stored in the power storage part and with a high transmission accuracy.

In the remote control apparatus according to the present invention, it is preferable that the remote control apparatus further comprises stored power detection means which detects electric power stored in the power storage part, wherein the control part does not transmit the water spray signal until the electric power detected by the stored power detection means becomes equal to or higher than the predetermined amount.

In the preferred embodiment, since the water spray signal is not transmitted until the electric power detected by the stored power detection means becomes equal to or higher than the predetermined amount, the water spray signal is prevented from being transmitted in a state in which electric power has not been sufficiently stored in the power storage part and it is therefore possible to transmit the water stop signal reliably with a high transmission accuracy.

In the remote control apparatus according to the present invention, it is preferable that: the transfer part includes a first transfer part which receives force from each button in the main button group and a second transfer part which receives force from each button in the sub-button group; when a button in the main button group is pressed, the first transfer part which receives force from the pressed button transfers mechanical energy to the second transfer part and the second transfer part transfers the mechanical energy to the power generation part; and when a button in the sub-button group is pressed, the second transfer part which receives force from the pressed button does not transfer mechanical energy to the first transfer part but transfers mechanical energy to the power generation unit.

In the preferred embodiment, when a button in the sub-button group is pressed, the mechanical energy is transmitted only by the second transfer part and without using the first transfer part. Consequently, the force required for pressing each button in the sub-button group can be made small. In addition, the second transfer part is also used to transfer the mechanical energy when a button in the main button group is pressed. The second transfer part is shared by the transfer of mechanical energy as a result of the pressing operation of each button in the main button group and of each button in the sub-button group, and it is thus possible to enhance transmission accuracy of the change signal without the need for making the remote control apparatus larger than necessary.

In the remote control apparatus according to the present invention, it is preferable that a maximum depth of pressing of each button in the sub-button group is larger than a maximum depth of pressing of each button in the main button group.

The electric power which can be input by the user's pressing of a button depends on the force applied to the button and the distance of movement of the button. In the preferred embodiment, since the maximum depth of pressing of each button in the sub-button group is larger than that of each button in the main button group, it is possible to input the amount of mechanical energy which is sufficient to transmit the change signal with a high transmission accuracy while reducing the force required for the pressing operation. The "maximum depth of pressing" herein refers to the distance of movement of each button in the selection part from a position where the button does not receive any force from a user to a position where the button cannot be pressed any further even by further application of force.

In the remote control apparatus according to the present invention, it is preferable that the electric power generated by the power generation part as a result of the pressing operation of each button in the sub-button group is smaller than the electric power generated by the power generation part as a result of the pressing operation of each button in the main button group.

In the preferred embodiment, since the electric power generated by the power generation part as a result of the pressing operation of each button in the sub-button group is smaller than that for each button in the main-button group, each button in the sub-button group only needs to be pressed so as to input mechanical energy according to such small amount of electric power. Accordingly, the force required for pressing each button in the sub-button group can be made small.

It can be assumed that the reduction in electric power generated as a result of the pressing operation of each button in the sub-button group may cause a problem in which the electric power generated by one pressing operation may not be enough to transmit a change signal with a sufficient transmission accuracy. However, each button in the sub-button group for changing the water spray state has a lower priority as compared to each button in the main button group, including buttons related to the basic operations of the toilet seat. Thus, even if a sufficient amount of electric power cannot be obtained by one pressing operation of a button in the sub-button group and the user is thus required to press the button again, no significant problem will occur. In other words, in the preferred embodiment, the basic operation of the toilet seat apparatus can be reliably performed by the pressing operation of each button in the main button group while reducing the power required for pressing each button in the sub-button group within the range which would not cause a significant problem in practical use.

According to the present invention, it is possible to provide a remote control apparatus for a toilet seat apparatus which generates electric power as a result of a user's pressing operation, the remote control apparatus being capable of balancing operability and transmission accuracy of a water stop signal at a high level.

DETAILED DESCRIPTION OF PREFERRED EMBODIMENTS

Embodiments of the present invention will be described below with reference to the attached drawings. In order to aid understanding, the same component is denoted by, wherever possible, the same reference numeral in the drawings and redundant descriptions thereof will be omitted.

Figure 1:
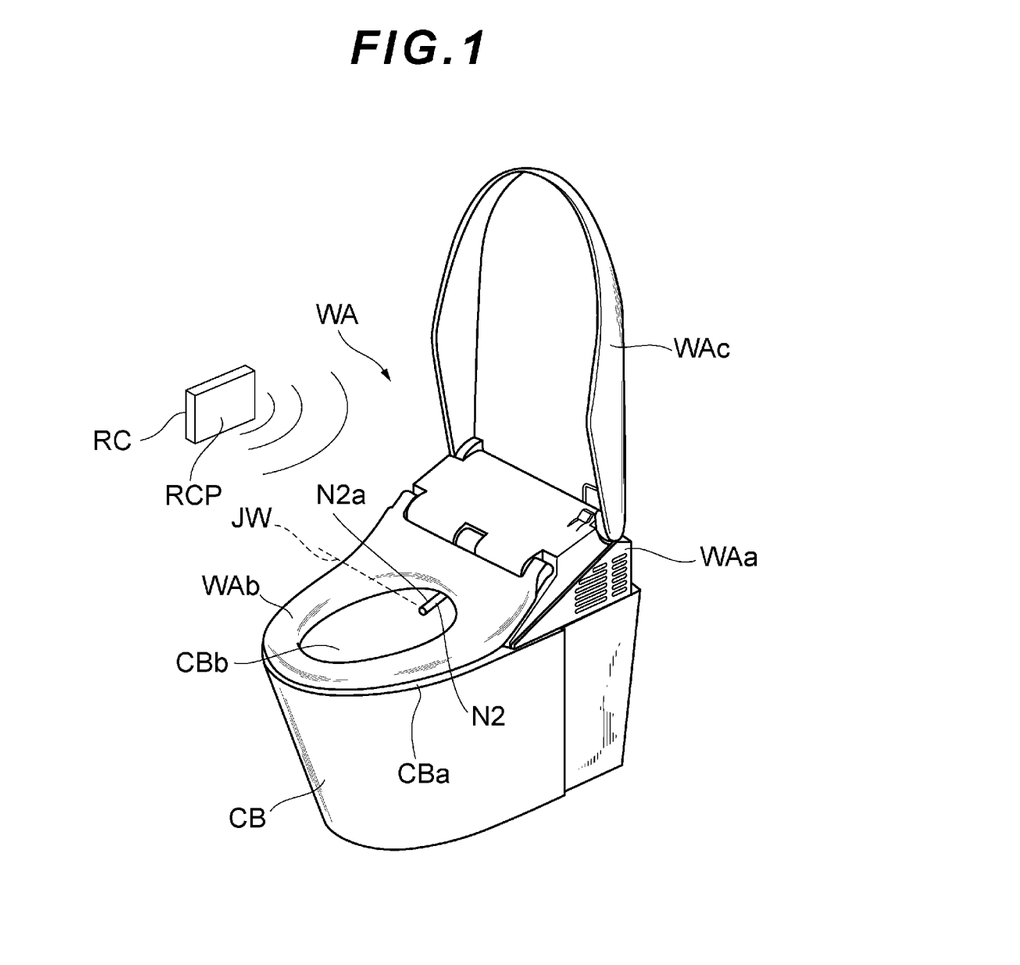
FIG. 1 is a perspective view showing a remote control apparatus and a toilet seat apparatus according to an embodiment of the present invention.

First, the state of use of a remote control apparatus according to the present invention will be described with reference to FIG. 1. FIG. 1 is a perspective view showing a toilet seat apparatus and a remote control apparatus according to an embodiment of the present invention.

A toilet seat apparatus WA is mounted on a rim CBa of a toilet bowl CB and includes a main body WAa, a seat WAb and a cover WAc. The main body WAa incorporates electric components, a water supply mechanism, etc. therein and has a nozzle N2 which may advance and retract with respect to a bowl part CBb of the toilet bowl CB. The column-shaped nozzle N2 has a nozzle hole N2a on its upper surface. When the nozzle N2 receives water supplied from the water supply mechanism in a state in which it is advanced inside the bowl part CBb, the water is sprayed from the nozzle hole N2a as a jet flow JW toward the private parts of a user. The seat WAb on which the user is seated when relieving himself/herself is pivotably supported with respect to the main body WAa. When the seat WAb is not being used, the seat WAb is covered from the above with the cover WAc which is also pivotably supported with respect to the main body WAa.

A remote control apparatus RC is fixed onto a wall surface or the like of a bathroom compartment in which the toilet bowl CB and the toilet seat apparatus WA are installed. The remote control apparatus RC is provided with a panel RCP so as to face the toilet seat apparatus WA and the user selects an operation to be performed by the toilet seat apparatus WA from the panel RCP to remotely control the toilet seat apparatus WA. Specifically, the remote control apparatus RC generates a high-frequency signal based on the content selected by the user from the panel RCP and wirelessly transmits the signal to the toilet seat apparatus WA. The toilet seat apparatus WA receives the high-frequency signal at a receiving part incorporated in the main body WAa and performs operations, such as starting or stopping water spray from the nozzle N2, adjusting the strength of water spray and changing the position of the nozzle N2, based on the content of the signal.

Figure 2:
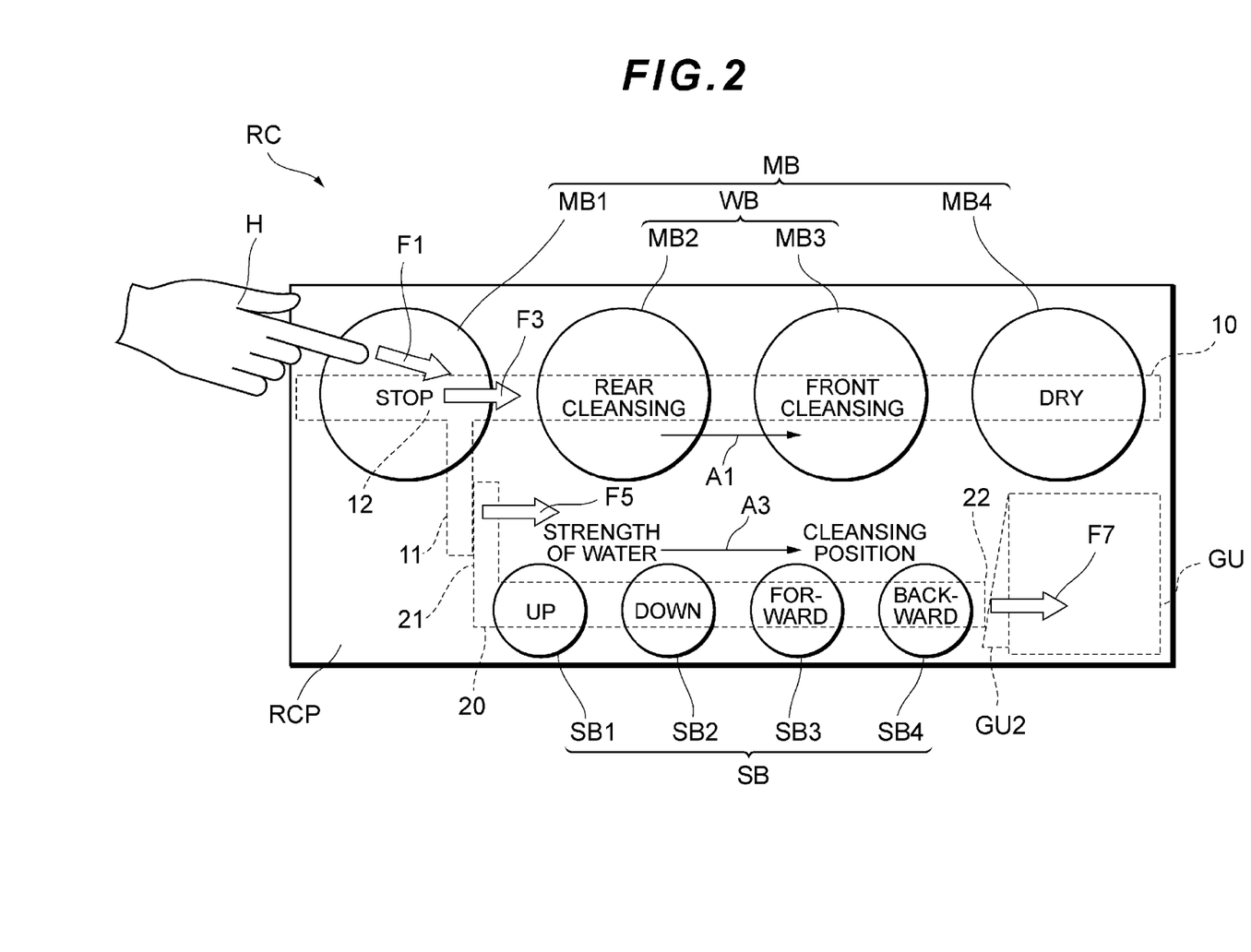
FIG. 2 is a front view showing a state in which a button in a main button group is pressed in a remote control apparatus according to an embodiment of the present invention.
Figure 3:
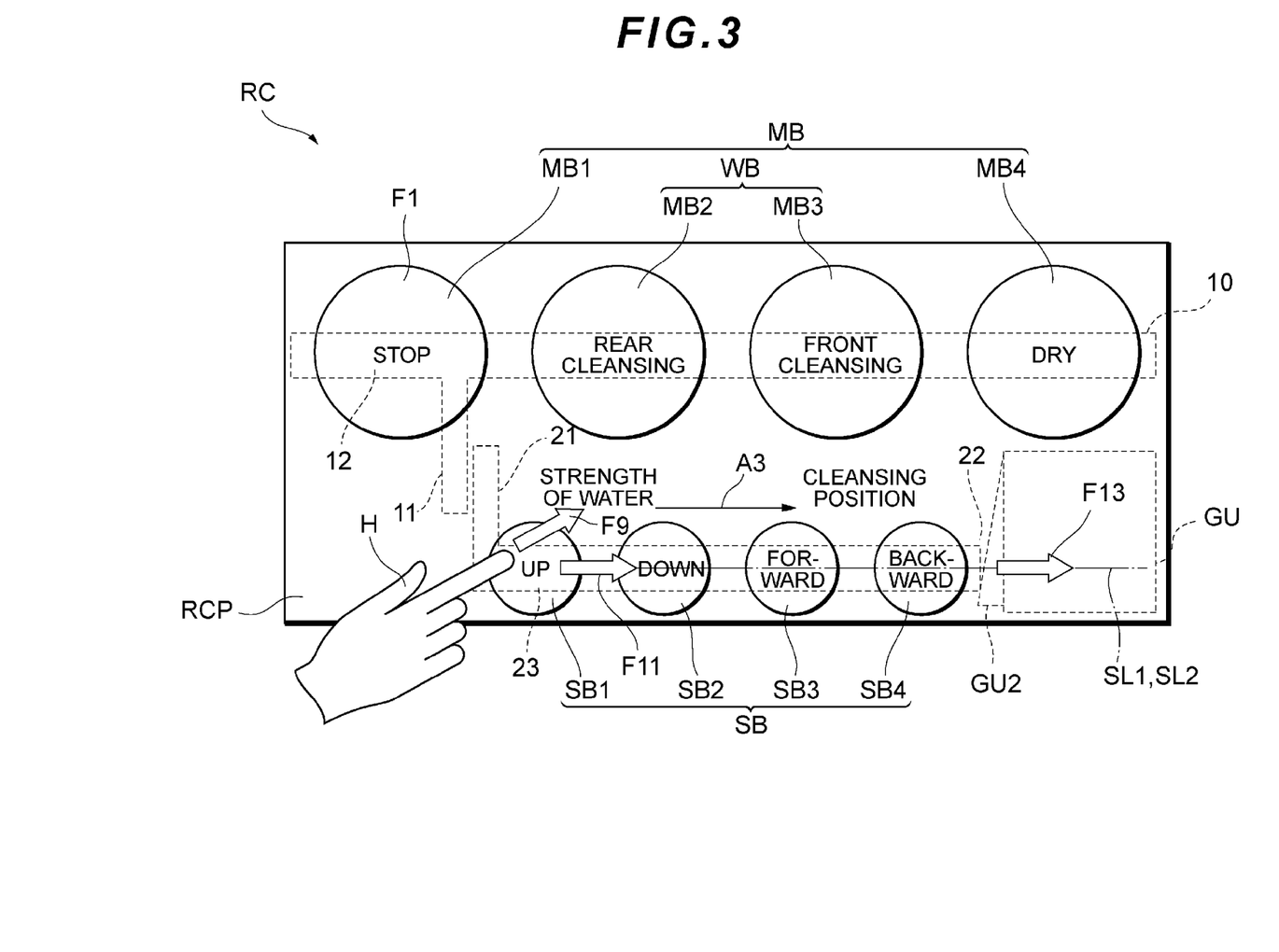
FIG. 3 is a front view showing a state in which a button in a sub-button group is pressed in a remote control apparatus according to an embodiment of the present invention.

Next, a motion resulting from the pressing operation of each button in the remote control apparatus according to an embodiment of the present invention will be described with reference to FIGS. 2 and 3. FIG. 2 is a front view showing a state in which a button in a main button group is pressed in the remote control apparatus according to an embodiment of the present invention. FIG. 3 is a front view showing a state in which a button in a sub-button group is pressed in the remote control apparatus according to an embodiment of the present invention.

As shown in FIG. 2, the panel RCP of the remote control apparatus RC includes a main button group MB arranged above and a sub-button group SB arranged below the main button group MB.

The main button group MB includes a stop button MB1, water spray buttons WB and a drying button MB4. The water spray buttons WB further include a rear cleansing button MB2 and a front cleansing button MB3. These four buttons are each circular from a front view and are arranged substantially linearly at an interval in the width direction of the remote control apparatus RC. The water spray buttons WB are buttons pressed to cause water spray operations from the nozzle N2, where water is sprayed to the anus of a user when the rear cleansing button MB2 is pressed and water is sprayed toward the genitals of a female user when the front cleansing button MB3 is pressed. The drying button MB4 is a button pressed to cause a drying operation in which warm air is blown toward the cleansed private parts from a fan incorporated in the main body WAa after cleansing. The stop button MB1 is a button pressed in order to stop the water spray operations and the drying operation.

The sub-button group SB includes a stronger button SB1, a weaker button SB2, a forward button SB3 and a backward button SB4. These four buttons are each circular from a front view with a diameter smaller than that of each button in the main button group MB and arranged substantially linearly at an interval in the width direction of the remote control apparatus RC. The stronger button SB1 and the weaker button SB2 are buttons pressed to change the strength of the water spray from the nozzle N2 in accordance with the user's preference. The forward button SB3 and the backward button SB4 are buttons pressed to change the position of the nozzle N2 in accordance with the position of the private parts of the user's body.

The shape of each button in the main button group MB and the sub-button group SB is not limited to a circular shape but may employ various shapes. Each button in the main button group MB and each button in the sub-button group SB may have respectively different shapes. However, in order to configure the size of the entire remote control apparatus RC so as to be reduced, it is preferable to form each button in the sub-button group, which are used in a relatively low frequency, in a size smaller than each button in the main button group MB, which are used in a relatively high frequency.

As shown by the broken line in FIG. 2, a first slide member 10 and a second slide member 20, which extend in the width direction of the remote control apparatus RC, are incorporated in the remote control apparatus RC at the rear surface side of the main button group MB and the sub-button group SB, respectively. A power generation unit GU is also incorporated in the remote control apparatus RC at the lower side of the first slide member 10 and at the lateral side of the second slide member 20.

The first slide member 10 has a transfer projection 11 which projects toward the second slide member 20. The second slide member 20 has a transfer projection 21 which projects toward the first slide member 10 at a portion on the power generation unit GU side with respect to the transfer projection 11.

The first slide member 10 is configured so as to be slidable in the direction indicated by an arrow A1 when any of the buttons in the main button group MB is pressed. For example, when the stop button MB1 is pressed toward the rear surface side by a user's finger H with force F1, a stop input part 12 of the first slide member 10 receives force F3 in the direction indicated by the arrow A1 from the stop button MB1. The force F3 causes the first slide member 10 to slide in the direction indicated by the arrow A1 and causes the transfer projection 11 thereof to come into contact with the transfer projection 21 of the second slide member 20. The transfer projection 21 receives force F5 due to the contact with the transfer projection 11 of the first slide member 10 and the second slide member 20 slides in the direction indicated by an arrow A3, which is a direction parallel to the direction indicated by the arrow A1.

On the other hand, the second slide member 20 is configured so as to be independently slidable when any one of the buttons in the sub-button group SB is pressed. For example, when the stronger button SB1 is pressed toward the rear surface side by a user's finger H with force F9 as shown in FIG. 3, the stronger input part 23 of the second slide member 20 receives force F11 in the direction indicated by the arrow A3 from the stronger button SB1. The force F11 causes the second slide member 20 to slide in the direction indicated by the arrow A3. At this time, since the transfer projection 21 of the second slide member 20 moves in a direction away from the transfer projection 11 of the first slide member 10, the second slide member 20 independently slides without coming into contact with the first slide member 10.

As described above, when any one of the buttons in the main button group MB or the sub-button group SB is pressed, the second slide member 20 slides in the direction indicated by the arrow A3. Consequently, the output part 22 of the second slide member 20 presses an energy input part GU2 of the power generation unit GU with force F7 or force F13. The power generation unit GU uses the mechanical energy input by the energy input part GU2 to generate electric power.

When a button in the main button group MB is pressed, the transfer projection 11 of the first slide member 10 and the transfer projection 21 of the second slide member 20 come into contact with each other and apply force to each other to thereby transfer mechanical energy, and a bending moment is thus generated in each of the transfer projections 11 and 21. Such deformation of the first slide member 10 and the second slide member 20 causes a loss in the mechanical energy caused until the mechanical energy input by the pressing operation of each button is transferred to the power generation unit GU.

On the other hand, when a button (the stronger button SB1 in the illustrated example) in the sub-button group SB is pressed, a linear line SL1 passing the stronger input part 23 of the second slide member 20 and extending in the direction of action of the force F11 and a linear line SL2 passing the output part 22 of the second slide member 20 and extending in the direction of action of the force F13 are configured so as to substantially coincide with each other. With such configuration, the force received by the input part on the rear surface side of each button as a result of the pressing operation of each button in the sub-button group SB is linearly transferred to the output part 22. Accordingly, the loss in the mechanical energy caused until the mechanical energy input by the pressing operation of each button in the sub-button group SB is transferred to the power generation unit GU can be made small In addition, when a button in the sub-button group SB is pressed, only the second slide member 20 is used to transfer the mechanical energy to the power generation unit GU, without using the first slide member 10. Thus, the force required for pressing each button in the sub-button group SB can be made small.

The slide member 20 is also used to transfer mechanical energy as a result of the pressing operation of each button in the main button group MB. Since the second slide member 20 is shared by the transfer of mechanical energy as a result of the pressing operation of each button in the main button group MB and of each button in the sub-button group SB, the size of the remote control apparatus RC does not have to be unnecessarily large.

Figure 4:
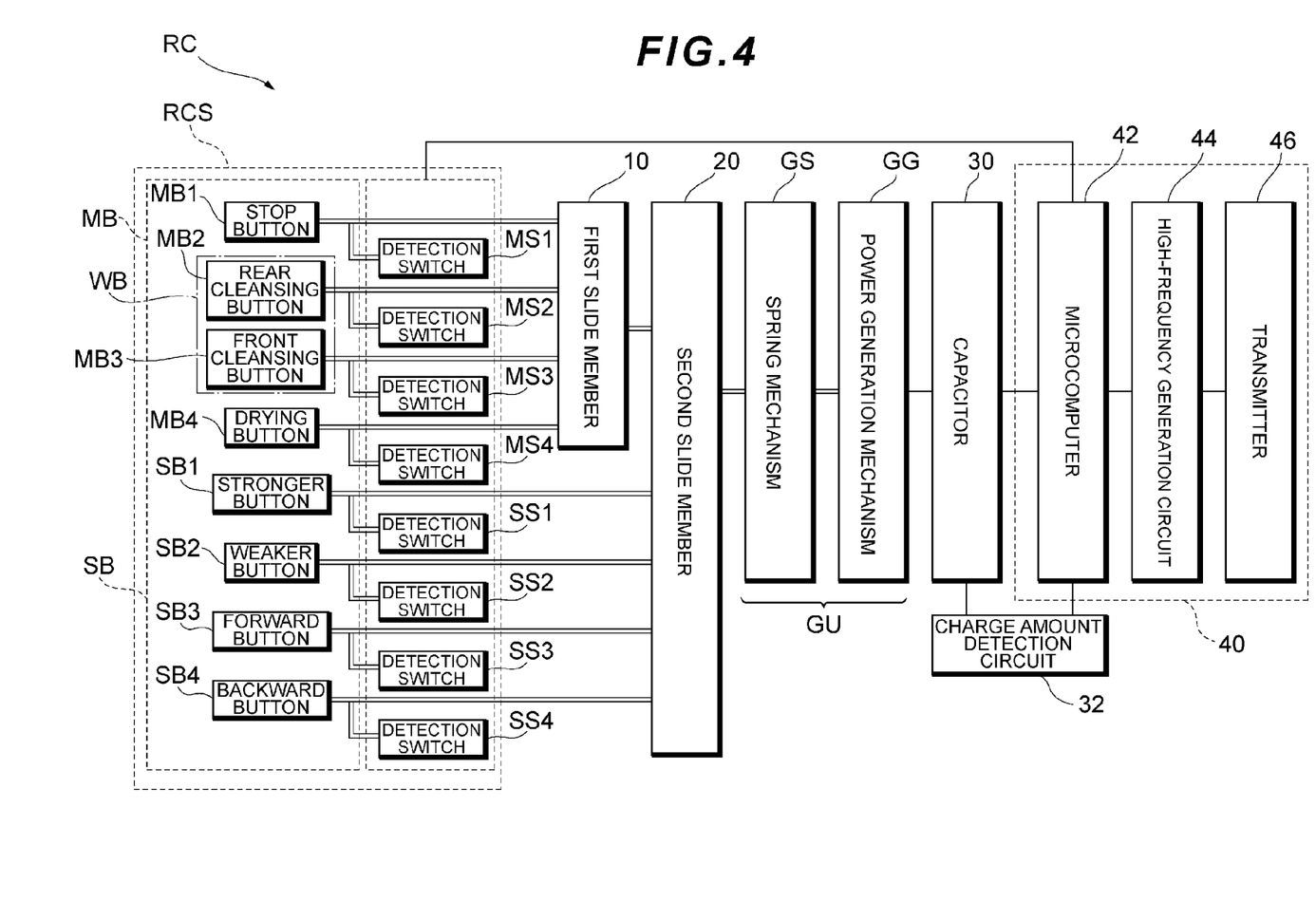
FIG. 4 is a block diagram showing a remote control apparatus according to an embodiment of the present invention.

Next, the mechanical configuration and electrical configuration of the remote control apparatus according to an embodiment of the present invention will be described with reference to FIG. 4. FIG. 4 is a block diagram showing the remote control apparatus according to the embodiment of the present invention.

In FIG. 4, electrically-connected elements are shown so as to be connected by a single line, while elements between which force or mechanical energy is transferred are shown so as to be connected by two lines. As discussed above, when any one of the buttons in the main button group MB is pressed by the user, the pressing force is configured so as to be transferred via the first slide member 10 to the second slide member 20, while when any one of the buttons in the sub-button group SB is pressed, the pressing force is configured so as to be directly transferred to the second slide member 20. The second slide member 20 slides due to the transferred force so as to further transfer the force to the power generation unit.

The power generation unit GU has a spring mechanism GS and a power generation mechanism GG. The spring mechanism GS is a mechanism capable of storing the mechanical energy input by the second slide member 20 as spring elastic energy and releasing the stored energy. When the spring mechanism GS releases the stored mechanical energy, the mechanical energy is transferred to the power generation mechanism GG in the power generation unit GU where the mechanical energy is converted to electric energy and electric power is generated.

The electric power generated by the power generation unit GU is supplied to a capacitor 30. The capacitor 30 is charged with the supplied electric power.

An output terminal of the capacitor 30 is connected to a control unit 40. The control unit 40 includes a microcomputer 42, a high-frequency generating circuit 44 and a transmitter 46. The microcomputer 42 is activated by electric power supplied from the capacitor 30 and controls the high-frequency generating circuit 44 and the transmitter 46. However, the microcomputer 42 is configured so as not to be activated until a charge amount detection circuit 32 connected to the capacitor 30 detects that the amount of charge of the electric power in the capacitor 30 is equal to or more than a reference amount. Specifically, the charge amount detection circuit 32 detects the amount of charge of the electric power based on the voltage of the capacitor 30.

The buttons in the main button group MB and the sub-button group SB are connected to corresponding detection switches MS1-MS4 and SS1-SS4, respectively. These detection switches are switches for detecting the respective corresponding buttons being pressed by the user.

If any one of the buttons in the main button group MB or the sub-button group SB is pressed and the electric power in the capacitor 30 consequently becomes equal to or higher than the reference amount, the microcomputer 42 is activated upon the receipt of electric power supplied from the capacitor 30. The microcomputer 42 obtains information (as to which button has been pressed) from the detection switch, causes the high-frequency generating circuit 44 to generate a high-frequency signal based on the obtained information, and then causes the transmitter 46 to transmit the signal to the toilet seat apparatus WA.

Figure 5:
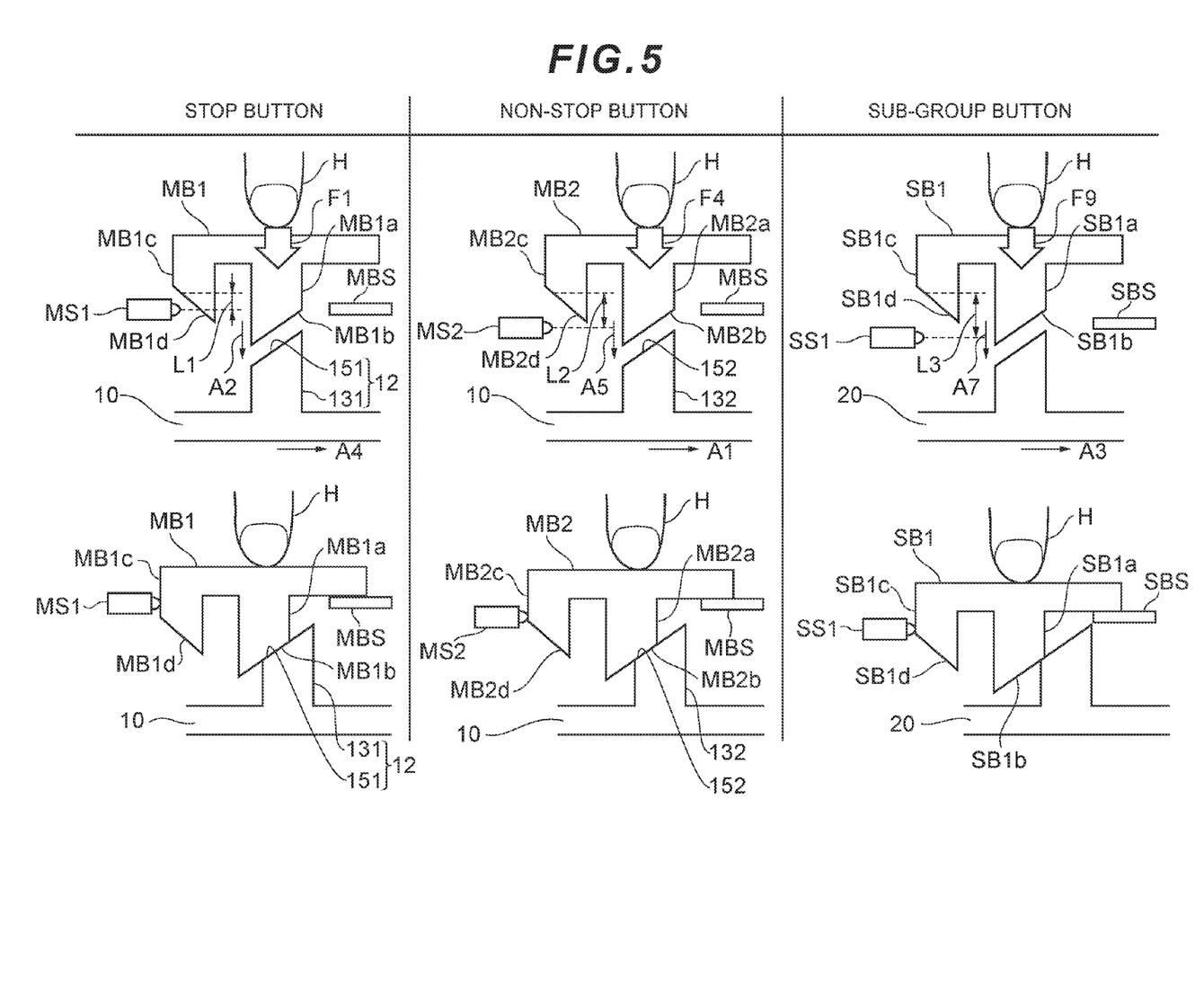
FIG. 5 is a bottom view schematically showing how the buttons move in a remote control apparatus according to an embodiment of the present invention.

Next, the pressing operation of each button and the detection of the button will be described with reference to FIG. 5. FIG. 5 is a bottom view schematically showing how the buttons move in the remote control apparatus according to an embodiment of the present invention.

In FIG. 5, the remote control apparatus RC is shown with its front surface side up and its rear surface side down. The left column shows a motion resulting from the pressing operation of the stop button MB1. The central column shows a motion resulting from the pressing operation of a button (the rear cleansing button MB2 in the illustrated example), other than the stop button MB1, in the main button group MB. The right column shows a motion resulting from the pressing operation of a button (the stronger button SB1 in the illustrated example) in the sub-button group SB. In each column, the upper drawing shows a state in which the user starts pressing the button and the lower drawing shows a state in which the button is pressed most deeply.

As shown in the left column of FIG. 5, the stop button MB1 has a central projection MB1a at a center of the rear surface thereof, the central projection MB1a extending toward the first slide member 10. The first slide member 10 has a projection 131 extending so as to face the central projection MB1a and these projections have a tilted surface MB1b and a tilted surface 151, respectively, on their facing surfaces. The projection 131 and the tilted surface 151 correspond to the above-described stop input part 12 which receives force as a result of the pressing operation of the stop button MB1.

The stop button MB1 also has a lateral projection MB1c at a lateral portion of the rear surface thereof, the lateral projection MB1c extending toward the first slide member 10. The lateral projection MB1c also has a tilted surface MB1d at an end on the rear surface side. The detection switch MS1 is arranged at a position away from the tilted surface MB1d toward the rear surface side by a distance L1.

When force F1 is applied to the stop button MB1 by a user's finger H, the stop button MB1 is pressed in the direction indicated by an arrow A2. When the stop button MB1 is pressed to the point where the tilted surface MB1b thereof comes into contact with the tilted surface 151 of the first slide member 10, the first slide member 10 then starts sliding in the direction indicated by the arrow A4 due to the force received by the tilted surface 151.

Then, when the stop button MB1 is pressed in the direction indicated by the arrow A2 by the distance L1, the tilted surface MB1d of the lateral projection MB1c thereof presses the detection switch MS1, whereby the detection switch MS1 can detect that the stop button MB1 has been pressed.

The user can then press the stop button MB1 until it comes into contact with a stopper MBS (as shown in the lower drawing in the left column). In other words, the distance of movement from a position where the user does not apply any force to the stop button MB1 until a position where the stop button MB1 comes into contact with the stopper MBS corresponds to the most deeply pressed position. The detection switch MS1 is configured so as to be capable of detecting that the stop button MB1 has been pressed, before the stop button MB1 reaches the most deeply pressed position.

The buttons other than the stop button MB1 in the main button group MB as illustrated in the central column of FIG. 5 also have basic configurations and motion similar to those of the stop button MB1, except for a difference in which a distance L2 between a tilted surface MB2d of a lateral projection MB2c and the detection switch MS2 is set so as to be larger than the distance L1. In short, the stop button MB1 is configured such that its pressed state can be detected with a smaller depth of pressing as compared to the buttons other than the stop button MB1 in the main button group MB.

The buttons in the sub-button group SB as illustrated in the right column in FIG. 5 also have basic configurations and motion similar to those of the stop button MB1, except for differences in which: a distance L3 between a tilted surface SB1d of a lateral projection SB1c and the detection switch SS1 is set so as to be larger than the distance L2; and a stopper SBS for defining the maximum depth of pressing of each button is arranged closer to the rear surface side as compared to the stopper MBS for each of the buttons in the main button group MB. Accordingly, when each button in the sub-button group SB is pressed to generate electric power in the power generation unit GU, it needs to be pressed more deeply than each button in the main button group MB.

As described above, since the maximum depth of pressing of each button in the sub-button group SB is larger than that for each button in the main button group MB, even with reduced force being required for pressing it is still possible to input sufficient mechanical energy.

Figure 6A:
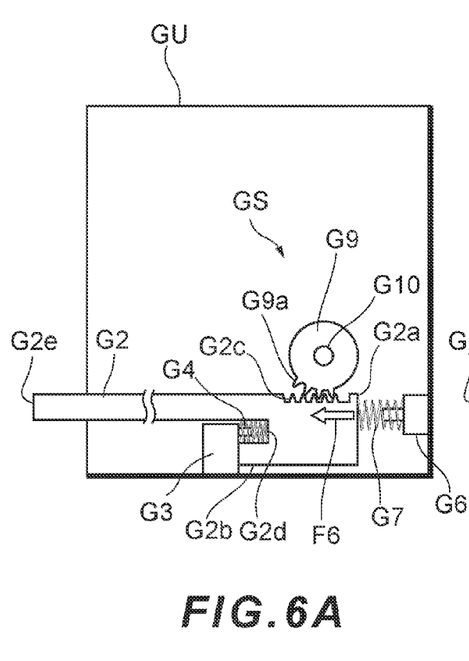
FIGS. 6A, 6B, and 6C are front views schematically showing a spring mechanism in a remote control apparatus according to an embodiment of the present invention.
Figure 6B:
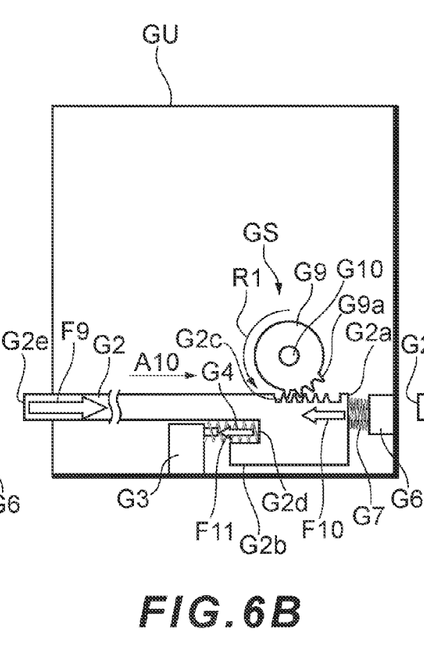
Figure 6C:
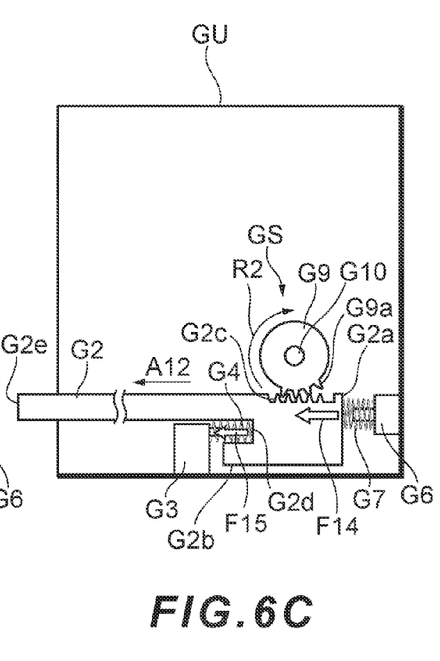
Figure 7:
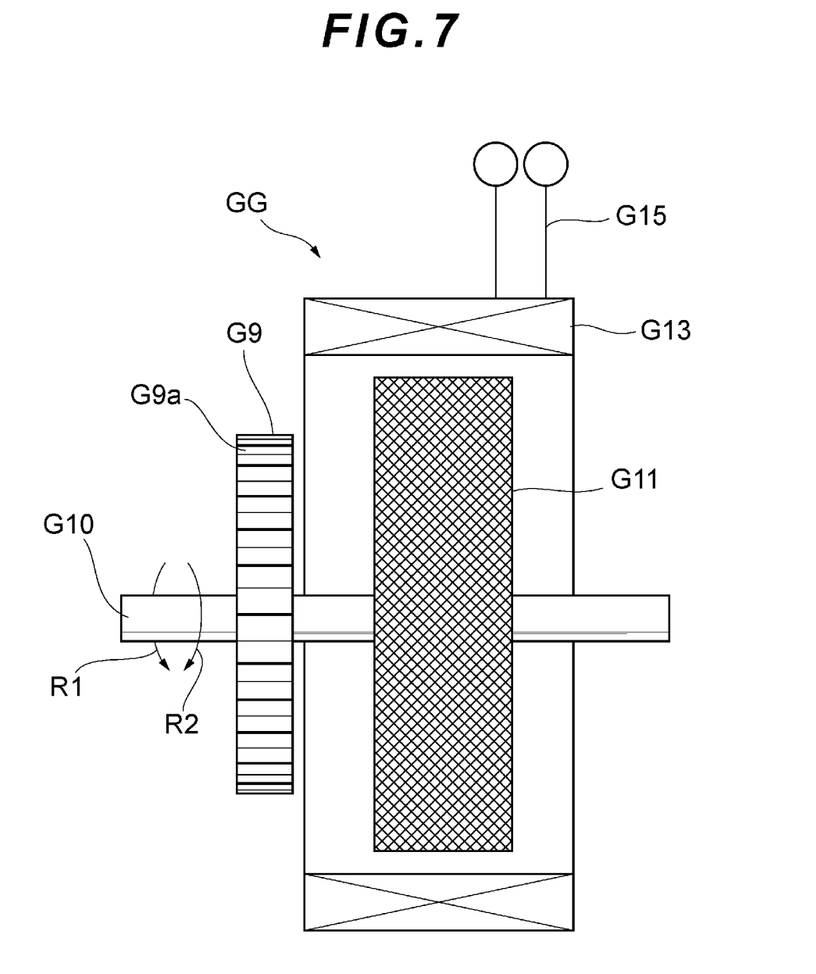
FIG. 7 is a side view schematically showing a power generation mechanism in a remote control apparatus according to an embodiment of the present invention.

Next, the generation of electric power in the power generation unit GU will be described with reference to FIGS. 6 and 7. FIG. 6 is a front view schematically showing a spring mechanism in the remote control apparatus according to an embodiment of the present invention. FIG. 7 is a side view schematically showing a power generation mechanism in the remote control apparatus according to an embodiment of the present invention.

FIG. 6(A) shows a state in which no button in the main button group MB or the sub-button group SB is pressed, FIG. 6(B) shows a state in which any one of the buttons is pressed and FIG. 6(C) shows a state in which the user presses a button most deeply. The spring mechanism GS incorporated in the power generation unit GU includes a key G2, a first spring G4 and a second spring G7.

The key G2 is a rod-like member extending in the width direction of the remote control apparatus RC and the key G2 has a projection G2b on a lower portion thereof. A portion in an upper surface of the key G2 is provided with a rack G2c. An end of the second spring G7 is fixed to a base G6 provided inside the power generation unit GU.

In the state shown in FIG. 6(A), the other end of the second spring G7 biases an end surface G2a of the key G2 with force F6 to thereby bring the projection G2b into contact with the stopper G3 provided inside the power generation unit GU to cause the key G2 to remain still. In addition, an end of the first spring G4 is also fixed to the stopper G3 and the other end thereof is fixed to a recess G2d of the key G2. In the state shown in FIG. 6(A), the first spring G4 is in almost its natural length and exerts almost no force on the key G2.

As shown in FIG. 7, the power generation mechanism GG includes a gear G9, a rotating shaft G10, a permanent magnet G11, a coil G13 and an output terminal G15.

The gear G9 is arranged above the key G2 (see FIG. 6) and teeth G9a provided on its periphery engage with a portion of the rack G2c of the key G2. The rotating shaft G10 is provided such that it serves as the center of rotation of the gear G9 and rotates with the gear G9. The permanent magnet G11 is fixed to the rotating shaft G10. The cylindrical coil G13 is provided around the permanent magnet G11 so as to be substantially coaxial with the rotating shaft G10.

The following description will assume a situation in which, in the power generation unit GU having the above-described configuration, any one of the buttons in the main button group MB or the sub-button group SB is pressed. When the second slide member 20 starts sliding as a result of the pressing operation of the button, the energy input part GU2 of the power generation unit GU is pressed as described above (see FIG. 2). At this time, the key G2 receives the force F9 at the end G2e thereof as shown in FIG. 6(B). The force received by the energy input part GU2 is transferred to the end G2e of the key G2 via a latch mechanism (not shown). As a result, the key G2 moves in the direction indicated by an arrow A10, receives force F10 while compressing the second spring G7 and receives force F11 while extending the first spring G4. Consequently, the mechanical energy input by the second slide member 20 is stored as the elastic energy resulting from the deformation of the first spring G4 and the second spring G7.

The movement of the key G2 in the direction indicated by the arrow A10 also causes the gear G9 whose teeth G9a are in engagement with the rack G2c to rotate in the direction indicated by the arrow R1. Consequently, the permanent magnet G11 fixed to the rotating shaft G10 rotates in the direction indicated by the arrow R1 in the coil G13 and electric power is generated by electromagnetic induction. The resulting electric power is extracted from the output terminal of the coil G13 for use in charging the capacitor 30.

When the user presses the button more deeply until the button comes into contact with the stopper (see the lower drawings in FIG. 5), the latch mechanism (not shown) interposed between the energy input part GU2 and the end G2e of the key G2 is released. As a result, even in the state in which the button remains in contact with the stopper, the key G2 receives force F15 and force F14 from the first spring G4 and the second spring G7, respectively, which are in a restoring motion, and moves in the direction indicated by an arrow A12, as shown in FIG. 6(C). As a result, the mechanical energy stored as the elastic energy resulting from the deformation of the first spring G4 and the second spring G7 is released.

At this time, the movement of the key G2 in the direction indicated by the arrow A12 causes the gear G9 to rotate in the direction indicated by the arrow R2. Consequently, the permanent magnet G11 is rotated in the direction R2 in the coil G13, electric power is thereby generated and the resulting electric power is used for charging the capacitor 30. Since the first spring G4 and the second spring G7 restore rapidly, the speed of rotation of the permanent magnet G11 in the direction indicated by the arrow R2 is faster than that in the direction indicated by the arrow R1 described above.

Figure 8:
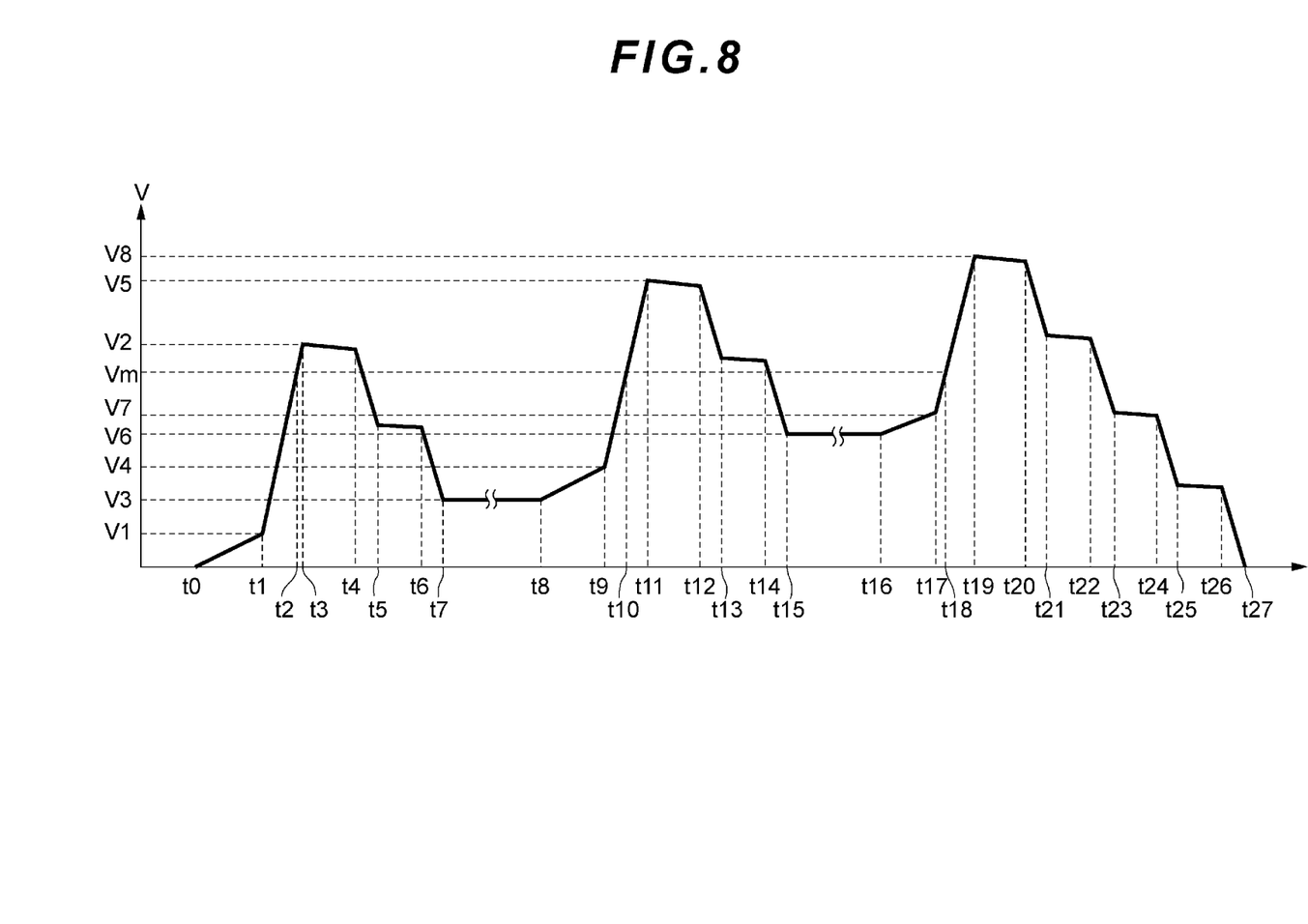
FIG. 8 is a graph showing changes in a capacitor voltage over time in a remote control apparatus according to an embodiment of the present invention.
Figure 9:
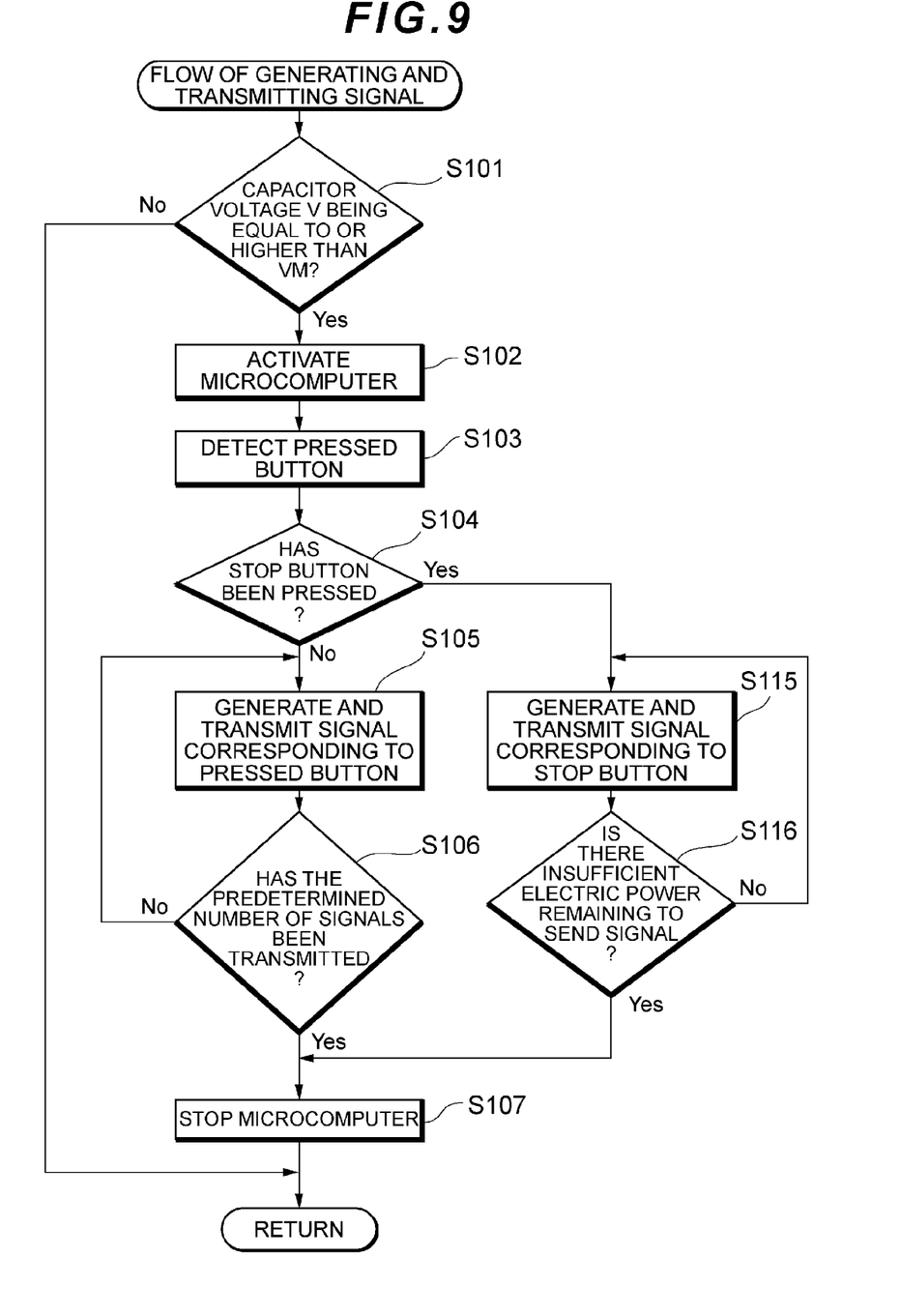
FIG. 9 is a flowchart showing a flow of generating and transmitting a signal in a remote control apparatus according to an embodiment of the present invention.

Next, a flow of generating and transmitting a signal when each button in the remote control apparatus is pressed will be described with reference to FIGS. 8 and 9. FIG. 8 is a graph showing changes in a capacitor voltage over time in the remote control apparatus according to an embodiment of the present invention. FIG. 9 is a flowchart showing a flow of generating and transmitting a signal of the remote control apparatus according to an embodiment of the present invention.

In FIG. 8, time t is plotted in the horizontal axis and voltages V of the capacitor 30 detected by the charge amount detection circuit 32 are plotted in the vertical axis. Specifically, the graph shows changes in the voltage V over time in a situation in which the rear cleansing button MB2 is first pressed, then the stronger button SB1 is pressed and the stop button MB1 is lastly pressed. FIG. 9 shows processing for controlling generation and transmission of a signal when any one of the buttons in the main button group MB or the sub-button group SB is pressed.

First, at t0 in FIG. 8, when a user who has relieved himself/herself starts pressing the rear cleansing button MB2 with his/her finger, mechanical energy thus input is stored in the spring mechanism GS. Since electric power is generated in the power generation mechanism GG at the same time, the voltage V of the capacitor 30 which is charged with such electric power increases to V1 (FIG. 8: t0 to t1).

When the user further presses the rear cleansing button MB2 until it comes into contact with the stopper MBS, the mechanical energy stored in the spring mechanism GS is released. Consequently, electric power is generated in the power generation mechanism GG and the voltage V of the capacitor 30 which is charged with such electric power increases to V2 (FIG. 8: t1 to t3).

The electric power (the electric power corresponding to the voltage V1 of the capacitor 30) generated when the user presses the rear cleansing button MB2 (FIG. 8: t0 to t1) depends on the speed of pressing and it is thus relatively small. On the other hand, after the user releases his/her finger from the pressed rear cleansing button MB2 (FIG. 8: t1 to t2) the permanent magnet G11 rotates at a high speed due to the rapid restoration of the first spring G4, etc. and a relatively large amount of electric power (the electric power corresponding to the voltage V2-V1 of the capacitor 30) is thus generated.

When the charge of the capacitor 30 is started as a result of the pressing of the rear cleansing button MB2, the charge amount detection circuit 32 judges whether or not the voltage V of the capacitor 30 has become equal to or higher than a reference value Vm (FIG. 8: S101). When the charge amount detection circuit 32 detects that the voltage V of the capacitor 30 has become equal to or higher than the reference value Vm (FIG. 8: t2, FIG. 9: S101—Yes), the supply of electric power from the capacitor 30 to the microcomputer 42 is started and the microcomputer 42 is activated (FIG. 9: S102).

The activated microcomputer 42 then obtains information from the detection switch (as to which button has been pressed) (FIG. 9: S103) and judges whether or not the button pressed by the user is the stop button MB1 (FIG. 9: S104). In this example, since the button pressed by the user is the rear cleansing button MB2, the microcomputer 42 determines that the pressed button is not the stop button MB1 (FIG. 9: S104—No) and the process proceeds to the next step.

Next, the microcomputer 42 causes the high-frequency generating circuit 44 to generate a high-frequency signal corresponding to the rear cleansing button MB2 (hereinafter referred to as the "water spray signal") (FIG. 8: t3 to t4, FIG. 9: S105). Then, the first water spray signal is transmitted from the transmitter 46 to the toilet seat apparatus WA (FIG. 8: t4 to t5, FIG. 9: S105).

The microcomputer 42 then judges whether or not the number of transmissions of the water spray signal has reached a preset number (i.e., two times) (FIG. 8: t5 to t6, FIG. 9: S106). In this step, since only the first water spray signal has been transmitted (FIG. 9: S106—No), the second water spray signal is transmitted from the transmitter 46 (FIG. 8: t6 to t7, FIG. 9: S105).

When the toilet seat apparatus WA receives at least one of these two transmitted water spray signals, it causes the nozzle N2 to advance into the bowl part CBb of the toilet bowl CB so as to start spraying water toward the private parts of the user.

The remote control apparatus RC transmits the second water spray signal (FIG. 8: t8, FIG. 9: S106—Yes) and then stops the microcomputer 42 (FIG. 9: S107).

Meanwhile, the electric power generated by the power generation mechanism as a result of the release of the mechanical energy from the spring mechanism GS (the electric power corresponding to the voltage V2-V1 of the capacitor 30) is set so as to be greater than the electric power required for the control unit 40 in order to generate and transmit the water spray signals twice. In other words, the control unit 40 generates and transmits the water spray signals using only a part of the electric power stored in the capacitor 30 at the point in time when the generation of the water spray signal is started (FIG. 8: t3). Accordingly, the electric power corresponding to the voltage V3 of the capacitor 30 still remains after the second water spray signal is transmitted.

The following description will assume a situation in which the user presses the stronger button SB1 in order to increase the strength of the water while the water is being sprayed from the nozzle N2 of the toilet seat apparatus WA.

At t8 in FIG. 8, when the user starts pressing the stronger button SB1 with his/her finger, the mechanical energy thus input is stored in the spring mechanism GS. Since electric power is generated in the power generation mechanism GG at the same time, the voltage V of the capacitor 30 which is charged with such electric power increases to V4 (FIG. 8: t8 to t9). In other words, the capacitor 30 is further charged with the electric power in addition to the electric power corresponding to the voltage V3 remaining in the capacitor 30 after the transmission of the water spray signals.

When the user further presses the stronger button SB1 until it comes into contact with the stopper SBS, the mechanical energy stored in the spring mechanism GS is released. Consequently, electric power is generated in the power generation mechanism GG and the voltage V of the capacitor 30 which is charged with such electric power increases to V5 (FIG. 8: t9 to t11).

When the charge of the capacitor 30 is started as a result of the pressing of the stronger button SB1, the charge amount detection circuit 32 judges whether or not the voltage V of the capacitor 30 has become equal to or higher than the reference value Vm (FIG. 9: S101). When the charge amount detection circuit 32 detects that the voltage V of the capacitor 30 has become equal to or higher than the reference value Vm (FIG. 8: t10, FIG. 9: S101—Yes), the supply of electric power from the capacitor 30 to the microcomputer 42 is started and the microcomputer 42 is activated (FIG. 9: S102).

The activated microcomputer 42 then obtains information from the detection switch (as to which button has been pressed) (FIG. 9: S103) and judges whether or not the button pressed by the user is the stop button MB1 (FIG. 9: S104). In this example, since the button pressed by the user is the stronger button SB1, the microcomputer 42 determines that the pressed button is not the stop button MB1 (FIG. 9: S104—No) and the process proceeds to the next step.

Next, the microcomputer 42 causes the high-frequency generating circuit 44 to generate a high-frequency signal corresponding to the stronger button SB1 (hereinafter referred to as the "change signal") (FIG. 8: t11 to t12, FIG. 9: S105). Then, the first change signal is transmitted from the transmitter 46 to the toilet seat apparatus WA (FIG. 8: t12 and t13, FIG. 9: S105).

The microcomputer 42 then judges whether or not the number of transmissions of the change signals has reached a preset number (i.e., two times) (FIG. 8: t13 to t14, FIG. 9: S106). In this step, since only the first change signal has been transmitted (FIG. 9: S106—No), the second change signal is transmitted from the transmitter 46 (FIG. 8: t14 to t15, FIG. 8: S105).

When the toilet seat apparatus WA receives at least one of these two transmitted change signals, it adjusts a water supply mechanism incorporated in the main body WAa so as to increase the strength of the water spray from the nozzle N2.

The remote control apparatus RC transmits the second change signal (FIG. 8: t15, FIG. 9: S106—Yes) and then stops the microcomputer 42 (FIG. 9: S107).

As described above, the control unit 40 only uses a part of the electric power stored in the capacitor 30 as of when the generation of the change signal is started (FIG. 8: t11) to generate and transmit the change signal. The electric power generated as a result of the user's pressing of the stronger button SB1 (the electric power corresponding to the voltage V5-V3 of the capacitor 30) is set so as to be greater than the electric power required for the control unit 40 to generate and transmit the change signals twice (the electric power corresponding to the voltage V5-V6 of the capacitor 30). Accordingly, more electric power (corresponding to the voltage V6) than the electric power remaining in the capacitor 30 after the transmission of the water spray signals (FIG. 8: t7) still remains in the capacitor 30 after the transmission of the change signals.

The following description will assume a situation in which the user presses the stop button MB1 in order to stop the water spray while the water is being sprayed with a high strength from the nozzle N2 of the toilet seat apparatus WA.

At t16 in FIG. 8, when the user starts pressing the stop button MB1 with his/her finger, the mechanical energy thus input is stored in the spring mechanism GS. Since electric power is generated in the power generation mechanism GG at the same time, the voltage V of the capacitor 30 which is charged with such electric power increases to V7 (FIG. 8: t16 to t17). In other words, the capacitor 30 is further charged with electric power in addition to the electric power corresponding to the voltage V6 remaining in the capacitor 30 after the transmission of the change signals.

When the user further presses the stop button MB1 until it comes into contact with the stopper MBS, the mechanical energy stored in the spring mechanism GS is released. Consequently, electric power is generated in the power generation mechanism GG and the voltage V of the capacitor 30 which is charged with such electric power increases to V8 (FIG. 8: t17 to t19).

The electric power generated as a result of the user's pressing of the stop button MB1 (the electric power corresponding to the voltage V8-V6 of the capacitor 30) is set so as to be smaller than the electric power generated as a result of the user's pressing of the rear cleansing button MB2 (the electric power corresponding to the voltage V2 of the capacitor 30).

When the charge of the capacitor 30 is started as a result of the pressing of the stop button MB1, the charge amount detection circuit 32 judges whether or not the voltage V of the capacitor 30 has become equal to or higher than the reference value Vm (FIG. 9: S101). When the charge amount detection circuit 32 detects that the voltage V of the capacitor 30 has become equal to or higher than the reference value Vm (FIG. 8: t18, FIG. 9: S101—Yes), the supply of electric power from the capacitor 30 to the microcomputer 42 is started and the microcomputer 42 is activated (FIG. 9: S102).

The activated microcomputer 42 then retrieves information from the detection switch (as to which button has been pressed) (FIG. 9: S103) and judges whether or not the button pressed by the user is the stop button MB1 (FIG. 9: S104). In this example, the microcomputer 42 determines that the button pressed by the user is the stop button MB1 (FIG. 9: S104—Yes) and the process proceeds to the next step.

Next, the microcomputer 42 causes the high-frequency generating circuit 44 to generate a high-frequency signal corresponding to the stop button MB1 (hereinafter referred to as the "water stop signal") (FIG. 8: t19 to t20, FIG. 9: S115). Then, a first water stop signal is transmitted from the transmitter 46 to the toilet seat apparatus WA (FIG. 8: t20 to t21, FIG. 9: S115).

The microcomputer 42 then judges whether or not the electric power sufficient to transmit another water stop signal still remains in the capacitor 30 after the transmission of the water stop signal (FIG. 8: t21 to t22, FIG. 9: S116). In this step, since sufficient electric power still remains in the capacitor 30 (FIG. 9: S116—No), the microcomputer 42 transmits a second water stop signal (FIG. 8: t22 to t23, FIG. 9: S115).

The remote control apparatus RC continues to transmit a third water stop signal (FIG. 8: t24 to t25, FIG. 9: S115) and a fourth water stop signal (FIG. 8: t26 to t27, FIG. 9: S115) until the capacitor 30 runs short of electric power sufficient to transmit any further water stop signals (FIG. 8: t27, FIG. 9: S116—Yes) and then stops the microcomputer 42 (FIG. 9: S107).

As described above, the control unit 40 transmits two water spray signals or two change signals, respectively, when the rear cleansing button MB2 or the stronger button SB1 is pressed once. On the other hand, the control unit 40 transmits four water stop signals when the stop button MB1 is pressed once to thereby enhance the transmission accuracy.

Upon the receipt of at least one of the four transmitted water stop signals, the toilet seat apparatus WA causes the water supply mechanism incorporated in the main body WAa to stop the water supply, causes the nozzle N2 to retract from the inside of the bowl part CBb of the toilet bowl CB, and stops the water spray.

Although the remote control apparatus RC according to the embodiment of the present invention enhances the transmission accuracy by transmitting four water stop signals, it may alternatively or additionally enhance the transmission accuracy by transmitting the water stop signal which has higher signal strength than the signal strengths of the water spray signal and the change signal.

The electric power generated by the power generation unit GU as a result of the pressing operation of each button in the sub-button group SB may be configured so as to be smaller than the electric power as a result of the pressing operation of each button in the main button group MB. With such configuration, the buttons in the sub-button group SB may only need to be pressed so as to input mechanical energy according to such small amount of electric power, and thus the force required for pressing them can be made small accordingly.

In the remote control apparatus RC according to the embodiment of the present invention, each button in the sub-button group SB is configured so as to transfer mechanical energy in priority to each button in the main button group MB. Specifically, a loss in the mechanical energy caused until the mechanical energy input by the pressing operation of each button in the sub-button group SB is transferred to the power generation unit GU is configured so as to be smaller than a loss caused by the pressing operation of each button in the main button group MB. As a result, the electric power generated by the pressing operation of each button in the sub-button group SB can be made large and the change signal can thus be transmitted with a high transmission accuracy. Accordingly, it becomes possible to maintain high design quality by forming each button in the sub-button group SB so as to be in a small size while enhancing the transmission accuracy of the change signal.

In addition, in the situation where each button (in the above example, the stronger button SB1) in the sub-button group SB is pressed, the linear line SL1 which passes the strength input part 23 of the second slide member 20 and extends in the direction of action of the force F11 and the linear line SL2 which passes the output part 22 of the second slide member 20 and extends in the direction of action of the force F13 are configured so as to substantially coincide with each other. Thus, the force received by the input part on the rear surface side of each button as a result of the pressing operation of each button in the sub-button group SB is linearly transferred to the output part 22. With such configuration, the loss in the mechanical energy caused until the mechanical energy input by the pressing operation of each button in the sub-button group is transferred to the power generation unit GU can be made small. Consequently, it becomes possible to generate relatively large electric power and enhance the transmission accuracy of the change signal.

The electric power is stored in the capacitor 30 by the pressing operation of the water spray button WB (in the above example, the rear cleansing button MB2), which the user of the toilet seat apparatus WA first presses, and such electric power is used for subsequent generation and transmission of the water stop signal. With such configuration, even if the electric power generated as a result of the pressing operation of the stop button MB1 is small, the water stop signal can still be transmitted with a high transmission accuracy. It is therefore possible to further balance an improvement in the operability of the stop button MB1 and an improvement in the transmission accuracy of the highly-important water stop signal.

The microcomputer 42 is not activated and the water spray signal is thus not transmitted until the voltage V of the capacitor 30 detected by the charge amount detection circuit 32 becomes equal to or higher than the reference value Vm. With such configuration, it is possible to prevent the water spray signal from being transmitted without a sufficient amount of electric power remaining in the capacitor 30 and therefore it is possible to transmit the water stop signal with an even higher transmission accuracy.

Embodiments of the present invention have been described above with reference to specific examples. However, the present invention is not limited to these specific examples. A person skilled in the art may appropriately add design modifications to the specific examples and such design modifications are also encompassed in the scope of the present invention. For example, each element included in each of the specific examples above, as well as the arrangement, material, condition, shape and size thereof, are not limited to those illustrated in the specific examples but may be modified as appropriate. In addition, the elements included in the respective embodiments above may be combined with each other, as long as the combinations are technically possible, and such combinations are also encompassed in the scope of the present invention as long as the combinations comprise the features of the present invention.

WA: toilet seat apparatus
RC: remote control apparatus
RCP: panel
10: first slide member
20: second slide member
30: capacitor
32: charge amount detection circuit
40: control unit
42: microcomputer
44: high-frequency generation circuit
46: transmitter
GG: power generation mechanism
GS: spring mechanism
GU: power generation unit
MB: main button group
MB1: stop button
MB2: rear cleansing button
MB3: front cleansing button
MB4: drying button
WB: water spray button
MS1 to MS4: detection switch
N2: nozzle
SB: sub-button group
SB1: stronger button
SB2: weaker button
SB3: forward button
SB4: backward button

What is claimed is:

1. A remote control apparatus for remotely controlling a toilet seat apparatus having a nozzle for spraying water toward private parts of a human body, the remote control apparatus comprising:
a selection part which includes: a main button group comprising a plurality of buttons which at least includes a water spray button for causing water spray from the nozzle and a water stop button for stopping water spray from the nozzle; and a sub-button group comprising a plurality of buttons for changing a state of the water spray from the nozzle, the buttons in the sub-button group being formed in a size smaller than the buttons in the main button group from a front view, the selection part selecting an operation of the toilet seat apparatus based on a pressing operation of a user of the toilet seat apparatus;
a transfer part which transfers mechanical energy input by the pressing operation in the selection part;
a power generation part which generates electric power using the mechanical energy transferred from the transfer part; and
a control part which generates a water spray signal when the water spray button is pressed and transmits the water spray signal to the toilet seat apparatus, generates a water stop signal when the water stop button is pressed and transmits the water stop signal to the toilet seat apparatus and generates a change signal when each button in the sub-button group is pressed and transmits the change signal to the toilet seat apparatus, using the electric power generated by the power generation part,
wherein:
a loss in the mechanical energy caused until the mechanical energy input by the pressing operation of each button in the sub-button group is transferred to the power generation part is smaller than a loss in the mechanical energy caused until the mechanical energy input by the pressing operation of each button in the main button group is transferred to the power generation part;
the transfer part includes: an input part which receives force from the selection part as a result of the pressing operation in the selection part; and an output part which transfers mechanical energy by applying force to the power generation part;
the pressing operation of a button in the sub-button group causes the input part to receive force in a first direction and causes the output part to apply force to the power generation part in a second direction; and
a first linear line passing the input part and extending in the first direction and a second linear line passing the output part and extending in the second direction are configured so as to substantially coincide with each other.

2. The remote control apparatus according to claim 1, further comprising a power storage part which stores electric power generated by the power generation part, wherein:
the control part generates the water spray signal and the water stop signal and transmits the signals to the toilet seat apparatus using the electric power stored in the power storage part;
the power generation part generates, when the water spray button is pressed, electric power larger than electric power required for the control part to generate and transmit the water spray signal so that electric power remains in the power storage part after the control part transmits the water spray signal; and
the control part generates and transmits, when the water stop button is pressed, the water stop signal using the electric power generated by the power generation part as a result of the pressing operation of the water stop button and the electric power stored in the power storage part as of the start of the pressing operation.

3. The remote control apparatus according to claim 2, wherein:
the transfer part includes a first transfer part which receives force from each button in the main button group and a second transfer part which receives force from each button in the sub-button group;
when a button in the main button group is pressed, the first transfer part which receives force from the pressed button transfers mechanical energy to the second transfer part and the second transfer part transfers the mechanical energy to the power generation part; and when a button in the sub-button group is pressed, the second transfer part which receives force from the pressed button does not transfer mechanical energy to the first transfer part but transfers mechanical energy to the power generation unit.

4. The remote control apparatus according to claim 2, wherein a maximum depth of pressing of each button in the sub-button group is larger than a maximum depth of pressing of each button in the main button group.

5. The remote control apparatus according to claim 2, wherein the electric power generated by the power generation part as a result of the pressing operation of each button in the sub-button group is smaller than the electric power generated by the power generation part as a result of the pressing operation of each button in the main button group.

6. The remote control apparatus according to claim 2, wherein the control part does not transmit the water spray signal until an amount of electric power generated by the power generation part as a result of the pressing operation of the water spray button becomes equal to or higher than a predetermined amount which allows electric power to remain in the power storage part after the control part transmits the water spray signal.

7. The remote control apparatus according to claim 6, further comprising stored power detection means which detects electric power stored in the power storage part, wherein the control part does not transmit the water spray signal until the electric power detected by the stored power detection means becomes equal to or higher than the predetermined amount.

* * * * *